US006995746B2

(12) United States Patent
Aymeric

(10) Patent No.: US 6,995,746 B2
(45) Date of Patent: Feb. 7, 2006

(54) METHOD FOR CONTROLLING THE MOVEMENT OF A CURSOR ON A SCREEN

(75) Inventor: Bruno Aymeric, St Medard (FR)

(73) Assignee: Thales, Paris (FR)

( * ) Notice: Subject to any disclaimer, the term of this patent is extended or adjusted under 35 U.S.C. 154(b) by 479 days.

(21) Appl. No.: 10/380,546

(22) PCT Filed: Sep. 14, 2001

(86) PCT No.: PCT/FR01/02869

§ 371 (c)(1),
(2), (4) Date: Mar. 17, 2003

(87) PCT Pub. No.: WO02/23322

PCT Pub. Date: Mar. 21, 2002

(65) Prior Publication Data

US 2004/0012562 A1 Jan. 22, 2004

(30) Foreign Application Priority Data

Sep. 15, 2000 (FR) .................................. 00 11816

(51) Int. Cl.
*G09G 5/00* (2006.01)

(52) U.S. Cl. ....................... 345/156; 715/862; 715/856

(58) Field of Classification Search ................ 715/856, 715/862, 858
See application file for complete search history.

(56) References Cited

U.S. PATENT DOCUMENTS

| | | | | | |
|---|---|---|---|---|---|
| 4,987,411 | A | * | 1/1991 | Ishigami | 345/159 |
| 5,510,811 | A | * | 4/1996 | Tobey et al. | 345/157 |
| 5,598,183 | A | | 1/1997 | Robertson et al. | |
| 5,808,601 | A | | 9/1998 | Leah et al. | |
| 5,808,604 | A | * | 9/1998 | Robin | 715/862 |
| 6,111,526 | A | | 8/2000 | Aymeric et al. | |
| 6,317,144 | B1 | * | 11/2001 | Pabla et al. | 715/854 |
| 6,587,131 | B1 | * | 7/2003 | Nakai et al. | 715/857 |

* cited by examiner

*Primary Examiner*—Kent Chang
(74) *Attorney, Agent, or Firm*—Lowe Hauptman & Berner, LLP

(57) ABSTRACT

This is a method of processing the movement of a cursor over a screen (12) which comprises one or more cursor activatable zones (10), at least one activatable zone (10) being surrounded by an attraction zone (11) which is associated therewith, and the method carrying out, during the movement of the cursor, toward a specified position (2) which is actual or fictitious, a conditional attraction step automatically placing the cursor on a specified activatable zone (10) only if a first condition is fulfilled, the first condition being fulfilled if the specified position is situated in the attraction zone (11) associated with the specified activatable zone (10). The invention can in particular be applied to an aircraft console screen.

32 Claims, 3 Drawing Sheets

METHOD FOR CONTROLLING THE MOVEMENT OF A CURSOR ON A SCREEN

The invention relates to the field of methods for processing the movement of a cursor over a screen which comprises one or more zones activatable by the cursor. With this screen is generally associated a designation block allowing a human operator to control the movement of the cursor over the screen and to designate a particular activatable zone by way of the cursor. The invention relates in particular to the field of methods for processing the movement of a cursor over an aircraft console screen.

According to a first prior art, a set of hard buttons allows the human operator to designate the activatable zones of the screen. A drawback of this prior art is that it rapidly tends to become complex and voluminous.

According to a second prior art, a touch pad allows the human operator to designate the activatable zones of the screen. A drawback of this prior art is that it allows accurate operation only with large sized activatable zones of the menu boxes type.

According to a third prior art, in the high-density zones of activatable zones, a device authorizing discrete type operation for the designation block is set in place. A drawback of this prior art is that it is not suited to low-density screen windows of activatable zones or to screen windows with non-predefined topology of activatable zones. Another drawback of this prior art is that it necessitates an unwieldy setup, which makes it particularly complex to manage any change in the layout of the activatable zones.

The problem of the various prior arts is either of offering complex and expensive solutions which are also partially ineffective, or of offering rather impractical and rather inefficient solutions on account of the inaccuracy of a human operator when he controls the cursor, in particular on the one hand when he controls it with the aid of a multidirectional control lever (called a "joystick"), and in particular on the other hand when the size on the screen of the activatable zones decreases.

U.S. Pat. Nos. 5,598,183 and 5,808,601 propose systems for controlling a cursor on a screen making it possible to automatically position the cursor in a position planned by a user. A means described in these patents is based on conditional attraction when the cursor is detected in a zone situated in the region of a monitoring zone.

The invention proposes a solution in which, even in the presence of activatable zones of relatively small size, even with the use of a multidirectional control lever, the designation of the activatable zones by command of a human operator remains practical and efficient, by virtue of the use, by the method for processing the movement of the cursor, of attraction zones respectively associated with all or part of the activatable zones on screen. The method according to the invention imposes a supplementary condition on the carrying out of the step of attraction toward the activatable zone making it possible to render this step more efficient and more practical.

According to the invention, there is provided a method of processing the movement of a cursor over a screen according to claim 1. The subject of the invention is also a system for controlling a cursor on a screen comprising a processing module for the implementation of the method according to the invention, associated with said screen.

The invention will be better understood and other features and advantages will become apparent with the aid of the following description and of the appended drawings, given by way of examples, where:

FIGS. 1 to 3 schematically represent three diagrams explaining two different types of mode of operation of the method according to the invention;

FIGS. 4 to 6 schematically represent three other diagrams explaining a preferred type of mode of operation of the method according to the invention;

Figure 1:
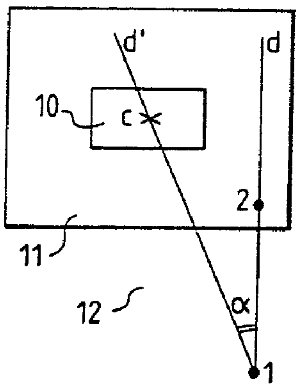

The processing method according to the invention is a method for processing the movement of a cursor over a screen. This method consists in applying a processing to the position of the cursor when the latter moves so as to render the movement of the cursor more practical and more efficient even if the command from the human operator exhibits a certain inaccuracy bringing the cursor near to the chosen activatable zone but without bringing said cursor into said chosen activatable zone. The screen comprises one or more zones activatable by the cursor, generally several activatable zones. A cursor activatable zone is a fictitious button on the screen which can be designated or activated by a simple command from the human operator, for example a press of the validation button of a multidirectional control lever, when the cursor is in said activatable zone. In a method according to the invention, at least one activatable zone is surrounded by an attraction zone which is associated therewith and preferably all the activatable zones present on the screen, or more precisely on a window of the screen, are surrounded by activatable zones which are respectively associated therewith: with each relevant activatable zone is associated one and only one attraction zone which surrounds said activatable zone. An attraction zone does not include the activatable zone which it surrounds. An attraction zone extends around the activatable zone and encompasses it without including it. The method according to the invention carries out, during the movement of the cursor toward a specified position which is actual or fictitious, a conditional attraction step. A specified position signifies that the method considers a particular position of the cursor, which position can be actual or fictitious, the specified position possibly being an actual position, that is to say a real position of the cursor on the trajectory of its movement, chosen on the trajectory by the method or otherwise, or else a fictitious position, that is to say a position which is simply estimated or anticipated by the method or otherwise, which position is fictitious at the moment at which the method carries out the conditional attraction step even if this position may become real thereafter. During the movement of the cursor toward said specified position signifies on the occasion of the movement of the cursor toward said specified position, this movement possibly being in particular a complete movement separated by two stopped positions of the cursor on the screen or a part of a larger movement or a set of elementary movements tending toward said specified position. Preferred modes for choosing the precise limits of the relevant movement as well as the specified position toward which said movement brings the cursor will be described subsequently. The attraction step carries out an "attraction" of the cursor toward a specified activatable zone, this attraction step is conditional, that is to say the attraction is actually carried out only if one or more conditions are fulfilled. The attraction toward a specified activatable zone, if it is actually carried out, consists in automatically placing the cursor on said specified activatable zone. The attraction can actually be carried out only if a first condition is fulfilled, that is to say it can be carried out only if this first condition is fulfilled, this first condition being fulfilled if the specified position is situated in the attraction zone associated with the specified activatable zone. One or more other conditions are also required in the preferred modes of operation of the method according to the invention, but this first condition is necessary, even if it is not sufficient in certain preferred modes of operation. In a preferred embodiment, when the specified position is in the attraction zone or else when the specified position is in the specified activatable zone, the first condition is fulfilled that is to say when the specified position is in the activatable zone and not in the associated attraction zone, the first condition is also considered to be fulfilled; this gives the human operator more time to react then possibly to activate the specified activatable zone before the cursor has overshot said specified activatable zone. However, in another possible embodiment, when the specified position is in the activatable zone and not in the associated attraction zone, the first condition is not considered to be fulfilled. In all the embodiments, when the specified position is in the attraction zone associated with the specified activatable zone, the first consideration is always considered to be fulfilled.

Preferably, the conditional attraction step is preceded by an evaluation step evaluating the direction of the movement of the cursor. The direction of the movement of the cursor can be any curve following the trajectory of the movement of the cursor or any curve reflecting the global direction of the movement of the cursor. Preferably, the direction of the movement is a line passing on the one hand through the specified position, actual or fictitious, and such as defined in the fore-going, and on the other hand through a point of the trajectory of the movement of the cursor, for example, through the position of the cursor at the start of the movement, the limits of said relevant movement being delimited in accordance with the foregoing. Preferably, the conditional attraction step is carried out only if, in addition to the first condition, a second condition is also fulfilled. In this preferred embodiment, at least two conditions must be fulfilled in order for the conditional attraction step to carry out an actual attraction of the cursor in a specified activatable zone. The second condition being fulfilled only if a portion of the direction of the movement of the cursor is situated in the vicinity of the specified activatable zone. In addition to the first condition, requiring that the specified position be situated in the attraction zone associated with the activatable zone in which the attraction of the cursor is achievable, a second condition requiring that a portion of the direction of the movement of the cursor be situated in the vicinity of the specified activatable zone, that is to say that the direction of the movement of the cursor be directed toward said activatable zone or toward the vicinity of said activatable zone, said vicinity being delimited in preferred modes of operation or embodiments described subsequently. This second condition makes it possible to avoid having to carry out an attraction toward a specified activatable zone, when, although the specified position is situated in the attraction zone associated with said activatable zone, the direction of the movement of the cursor does not apparently seem to be directed toward said activatable zone but rather without doubt toward another activatable zone further from the current position of the cursor than said specified activatable zone. In order for this second condition to be efficient, it is preferable for the vicinity of the relevant specified activatable zone, while including said specified activatable zone, when said vicinity comprises a part of the screen outside said specified activatable zone, to comprise an outside part which is less extensive than the attraction zone associated with said specified activatable zone. After an attraction has actually been carried out, the cursor is again managed by the normal method for managing the movement of the cursor, on which method is superimposed the method for processing the movement of the cursor according to the invention.

In a first type of mode of operation, the second condition is fulfilled only if the angle which a first line and a second line make between themselves, the first line being parallel to the direction of the movement of the cursor, the second line being the line which passes both through the center of the specified activatable zone and through the last current position of the cursor before the movement considered by the method, is less than a predetermined fixed threshold. Preferably, in the first type of mode of operation when several activatable zones fulfill the attraction conditions, the cursor is actually attracted toward the activatable zone which minimizes the angle between the first line and the second line. This first type of mode of operation will be described more precisely in conjunction with FIGS. 1 to 6, just as the second type of mode of operation which is the preferred type of mode of operation of the invention.

In the preferred second type of mode of operation of the invention, the second condition is fulfilled only if a portion of the direction of the movement of the cursor has a nonempty intersection with the relevant specified activatable zone. The second condition is thus rendered more selective and the implementation of the conditional attraction steps is rendered more efficient and more practical. Preferably, the second condition is fulfilled only if a portion, posterior to an intermediate position which lies between the current position of the cursor at the end of the previous movement after processing by the method and the specified position or else which coincides with one of said positions, of the direction of the movement of the cursor has a nonempty intersection with the relevant specified activatable zone. Thus, the attractions into activatable zones situated toward the rear of the movement of the cursor, which attractions are an impediment to the sensation of the human operator, are avoided. The intermediate position advantageously coincides with the current position of the cursor at the end of the previous movement after processing by the method. Thus, the calculations carried out by the method are rendered simpler. In order to avoid any possibility of untimely return toward the activatable zone in which the cursor is located and which said cursor wishes to exit, advantageously, the specified activatable zone toward which the cursor can be attracted can be any activatable zone with which an attraction zone is associated, except for the last activatable zone toward which the cursor has actually been attracted if the cursor is still in said last activatable zone at the start of the movement considered by the method. This second type of mode of operation with all its preferred options described previously will now be described more precisely, just as the first type of mode of operation, in conjunction with FIGS. 1 to 6.

Figure 2:
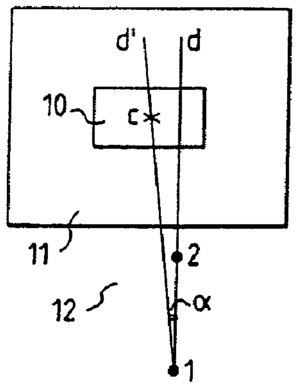
Figure 3:
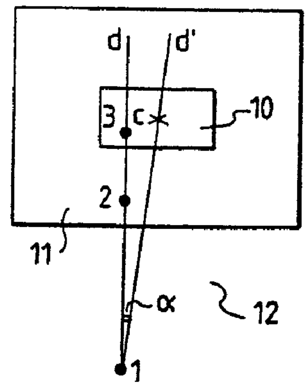

FIGS. 1 to 3 schematically represent three diagrams explaining two different types of mode of operation of the method according to the invention. A screen 12 comprises one or more activatable zones with the corresponding associated attraction zones. For reasons of simplicity, a single activatable zone 10 with the attraction zone 11 associated therewith, is represented in FIGS. 1 to 3. Let C be the center of the activatable zone 10. The position 1 is the position of the cursor at the start of the movement of the cursor considered by the method according to the invention. The position 2 is the specified position which can be considered to be the position toward which the cursor moves or tends to move. The position 3 is the position toward which the cursor is attracted when the conditional attraction step is actually carried out. Let d' be the line passing through the positions 1 and 2. Let d' be the line passing through the position 1 and through the center C of the activatable zone 10. Let α be the angle which the two lines d and d' make between themselves. Let us successively analyze the conduct of the conditional attraction step in the case of the first type of mode of operation then of the second type of mode of operation, the second type of mode of operation being more accurate than the first, the second type of mode of operation indeed exhibits accurate operation regardless of the distance between the position 1 and the center C, whereas the accuracy of the first type of mode of operation, either is correct for the positions 1 close to the activatable zone 10 and gets worse as the distance between the position 1 and the center C increases, or is incorrect for the positions 1 close to the activatable zone 10. Specifically, it is difficult to find for the angle α a threshold which is suitable both for the positions 1 close to and far from the activatable zone 10.

The operation of the method according to the invention in the first type of mode of operation is now analyzed more precisely. In FIG. 1, the specified position 2 is situated in the attraction zone 11, the first condition is therefore fulfilled. The angle α is greater than the predetermined threshold, the second condition is therefore not fulfilled. The conditional attraction step is consequently not actually carried out and the cursor remains in position 2. In FIG. 2, the specified position 2 is situated outside the attraction zone 11, the first condition is therefore not fulfilled. The angle α is less than the predetermined threshold, the second condition is therefore fulfilled. The conditional attraction step is consequently not actually carried out and the cursor remains in position 2. In FIG. 3, the specified position 2 is situated in the attraction zone 11, the first condition is therefore fulfilled. The angle α is less than the predetermined threshold, the second condition is therefore fulfilled. The conditional attraction step is consequently actually carried out and the cursor is placed in position 3, the position 3 being the intersection between the line d and a predesignated part of the activatable zone 10. The line d' passing through the center C and the angle α are used only in the first type of mode of operation.

The predesignated part can be any part whatsoever of the activatable zone 10 sufficiently covering the activatable zone 10. Preferred embodiments for the predesignated part of the activatable zones is described in conjunction with FIGS. 7 and 8. The presence of this predesignated part makes it possible, when the movements of the cursor succeed one another in a part on the screen which is dense in activatable zones and in associated attraction zones, to render the motion of the cursor straighter between the first movement and the last movement, thus avoiding a jagged detour which would be the case if the cursor, when actually attracted into the activatable zone 10, were systematically placed on the center C of the activatable zone 10.

The operation of the method according to the invention in the preferred second type of mode of operation is now analyzed more precisely. In FIG. 1, the specified position 2 is situated in the attraction zone 11, the first condition is therefore fulfilled. The line d exhibits no nonempty intersection with the activatable zone 10, that is to say exhibits an empty intersection with the activatable zone 10, the second condition is therefore not fulfilled. The conditional attraction step is consequently not actually carried out and the cursor remains in position 2. In FIG. 2, the specified position 2 is situated outside the attraction zone 11, the first condition is therefore not fulfilled. The line d exhibits a nonempty intersection with the activatable zone 10, the second condition is therefore fulfilled. The conditional attraction step is consequently not actually carried out and the cursor remains in position 2. In FIG. 3, the specified position 2 is situated in the attraction zone 11, the first condition is therefore fulfilled. The line d exhibits a nonempty intersection with the activatable zone 10, the second condition is therefore fulfilled. The conditional attraction step is consequently actually carried out and the cursor is placed in position 3, the position 3 being the intersection between the line d and a predesignated part of the activatable zone 10. In the course of the previous description of the second type of mode of operation, it is preferably the part of the line d posterior to the position 1, that is to say the half-line departing from the position 1 and directed from the position 1 toward the position 2, which had to exhibit a nonempty intersection with the specified activatable zone 10.

Figure 4:
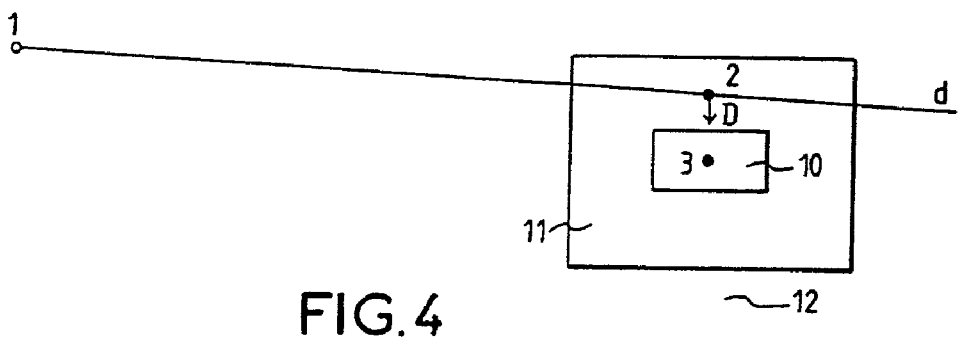
Figure 5:
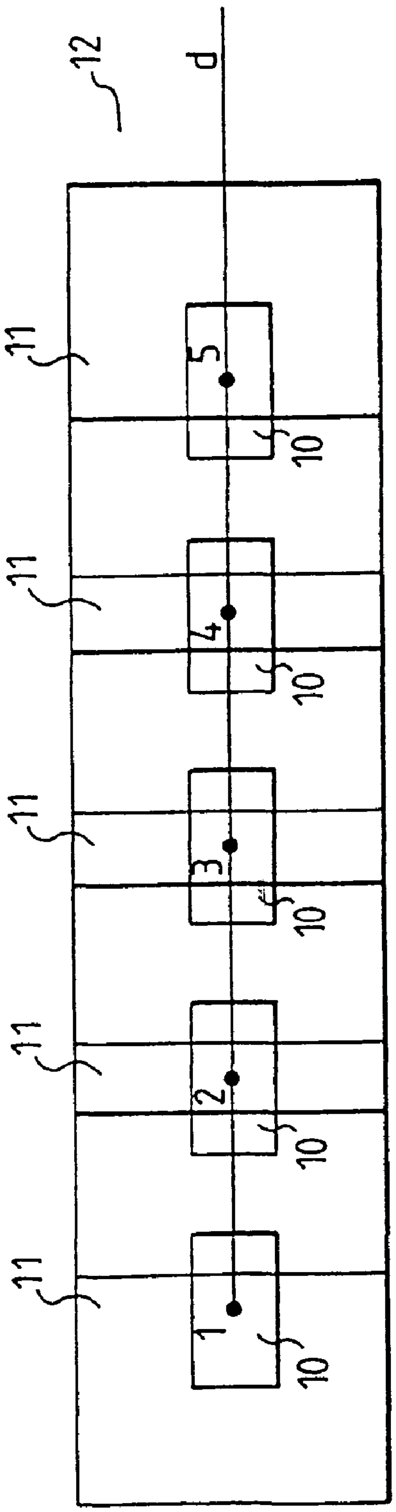
Figure 6:
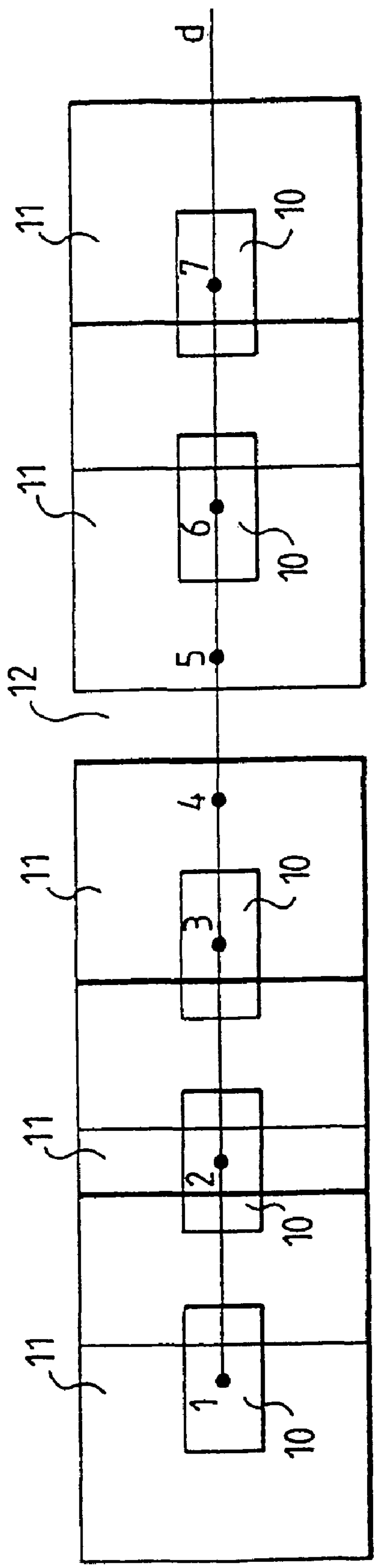

FIGS. 4 to 6 schematically represent three other diagrams explaining the preferred second type of mode of operation of the method according to the invention.

In FIG. 4, the starting position 1 is relatively far from the activatable zone 10. During a first movement, the cursor moves from the position 1 toward the position 2, so as to remain in position 2 without any attraction actually being carried out. Specifically, if the first condition is fulfilled, since the position 2 is situated in the attraction zone 11, the second condition is not, since the intersection between the line d and the activatable zone 10 is empty. However, after this first coarse movement of the cursor, a small command from the human operator downward symbolized by the arrow D, even relatively inaccurate, will bring the cursor directly into position 3, either naturally or by actual attraction into the activatable zone 10. In the absence of the method according to the invention, much trial and error by the human operator might be necessary, since said operator, if he is not very accurate, might in the course of several attempts, either stop before the activatable zone 10, or overshoot it, before being able to bring the cursor into said activatable zone 10 so as to then be able to activate said activatable zone 10.

Preferably, after an actual attraction of the cursor toward a specified activatable zone, the cursor is disabled for a normal disabling span compatible with a reaction of the human operator allowing him to stop the movement of the cursor in said specified activatable zone. Thus, the human operator can supply a command to activate the activatable zone in which the cursor is located before said activatable zone has been overshot. The normal disabling span advantageously lies between 250 ms and 350 ms. The normal disabling span is for example equal to around 300 ms. Preferably, after actual attraction of the cursor, in the event of the holding of the movement of the cursor by the human operator, the normal disabling span is reduced to a reduced disabling span for the next actual attraction if the latter immediately succeeds the actual attraction which precedes it. The reduced disabling span advantageously lies between 100 ms and 150 ms. The reduced disabling span is for example equal to around 125 ms. Suitable use of the normal and reduced disabling spans makes it possible to render the movement of the cursor more fluid in the high-density screen parts of activatable zones whilst avoiding the inadvertent overshooting of an activatable zone, as explained more precisely with regard to FIGS. 5 and 6.

In FIG. 5, the cursor is made to move into a part of the screen 12 which is dense in activatable zones 10. A partial overlapping of the contiguous attraction zones 11 allows discrete type operation in the sense that from the position 1, each small command toward the right on the part of the operator will place the cursor on the next activatable zone, independently of its intensity, on condition that the disabling span has elapsed: a first command toward the right places the cursor in position 2, a second command toward the right places the cursor in position 3, etc. The attraction zones can overlap partially but are not included in one another. From the position 3 inclusive, if the operator continuously holds his command for moving the cursor toward the right, the disabling span will be the reduced disabling span, so as not to traverse the activatable zones 1 to 5 too slowly, which might irritate the human operator.

In FIG. 6, the operation is similar to that of FIG. 5, but from the position 4, since no actual attraction is carried out at the level of the position 4, the disabling span again becomes the normal disabling span up to the position 5 inclusive where an attraction actually being carried out toward the position 6, the disabling span again becomes the reduced disabling span after attraction, remaining so until the position 7 inclusive. This manner of operation makes it possible to avoid overshooting the position 6 without allowing the human operator time to stop the cursor there.

Figure 8:
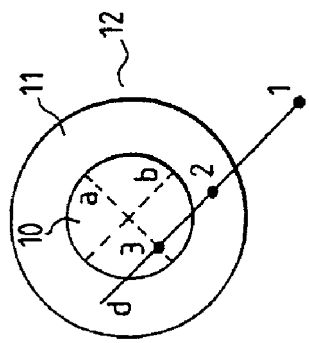
FIGS. 7 to 8 represent two types of shape of activatable zones used by a method according to the invention.
Figure 7:
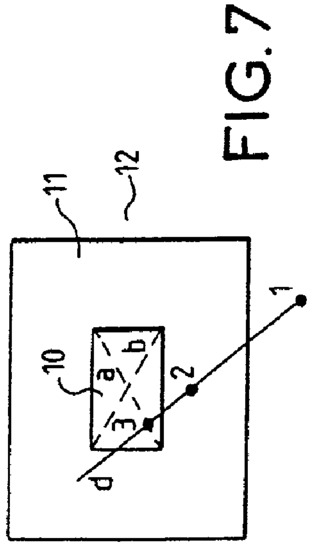

Preferably, when the cursor is automatically placed on a specified activatable zone during the conditional attraction step, the location, on which the cursor is placed, of the specified activatable zone is the intersection between the direction of the movement of the cursor and a predesignated part of the specified activatable zone. Advantageously, each activatable zone is of rectangular shape and the predesignated part consists of the two diagonals of the rectangular shape, denoted a and b in FIG. 7 and represented dashed. FIGS. 7 to 8 represent two types of shape of activatable zones used by a method according to the invention. FIGS. 7 and 8 represent a cursor moving from the position 1 toward the position 2 while fulfilling the conditions of the conditional attraction steps. The cursor is therefore attracted into the activatable zone 10. The cursor is then placed on the position 3, which is the intersection between the diagonals a and b on the one hand and the line d on the other hand. FIG. 7 represents an activatable zone 10 having a rectangular shape. FIG. 8 represents an activatable zone 10 having a circular shape.

Preferably, all the attraction zones situated on one and the same window of the screen have the same size, thereby making it possible to afford the human operator the same sensation when he moves from one activatable zone to another on one and the same screen window. Advantageously, each attraction zone is around some ten times more extensive than the activatable zone associated therewith, that is to say typically from five to fifteen times more extensive. The attraction zone surrounds in a substantially uniform manner the activatable zone with which it is associated, as in FIGS. 7 and 8 for example.

Preferably, in the absence of actual attraction of the cursor, the specified position is periodically evaluated by the method with a predetermined sampling period. The processing module implementing the method according to the invention is then a sampled device. Periodically, the method according to the invention carries out the conditional attraction step, that is to say verifies whether conditions for carrying out an actual attraction are fulfilled and actually carries out said attraction if the conditions are fulfilled, the movement being considered by the method, as beginning from the current starting position of the cursor which was the position reached by the cursor at the end of the previous movement, previous attraction inclusive if appropriate, and finishing at the position specified for this movement which will also be the current position of the cursor at the start of the next movement in the absence of actual attraction of the cursor into an activatable zone; in the presence of actual attraction of the cursor into an activatable zone, the position of the cursor at the conclusion of said attraction is different from said specified position. In this case, that is to say in the case of a sampled processing module, each movement is delimited by a starting position on the one hand and a specified position toward which the cursor is directed or seems to be directed on the other hand: the direction of the movement of the cursor is then preferably the line passing both through the starting position and through the specified position.

The specified position is preferably a position evaluated by the method from a speed vector cue for the movement of the cursor, which cue originates from a command from a human operator. Specifically, an attraction with a device giving a distance cue such as a mouse for example, would give a strange sensation to the human operator who would have the impression of a lack of correspondence between the movement of the cursor and the distance given by his command, by way of a mouse for example, and this would be less practical and less efficient for the human operator. Whereas with a multidirectional control lever, the human operator, giving only a direction and an intensity corresponding to a speed, will not be disturbed or at the very least will be less disturbed by the phenomenon of attraction of the cursor into an activatable zone. In the case where the human operator's command is manifested as a speed vector cue, the specified position in the course of a given period is preferably obtained by the addition, to the current position of the cursor at the end of the previous period, of a movement vector corresponding to the product of the movement speed vector times the sampling period. The cursor movement direction evaluated by the method is then advantageously the line passing both through the specified position and through the position of the cursor at the end of the previous period. Advantageously, the dimension of the attraction zone is greater than the portion of line lying between the position of the cursor at the end of the previous period and the specified position, that is to say than the segment lying between positions 1 and 2 when referring to FIGS. 1 to 8, so as to prevent the human operator from overshooting, without being able to stop there, an activatable zone and its associated attraction zone by a command of large intensity, that is to say for example by a fast motion sending a multidirectional lever hard over in one of its directions.

In the event of conflict, that is to say when several activatable zones fulfill the attraction conditions, the cursor is preferably actually attracted toward the activatable zone which is closest to the specified position. The distance considered being for example the distance between said specified position and the center of said activatable zone. However, other criteria for settling a conflict between several potential attractions are possible, for example the criterion consisting in choosing the activatable zone associated with the first attraction zone located on the trajectory of the movement of the cursor.

The method according to the invention is superimposed on the normal method of managing the movement of the cursor whilst remaining independent of said normal method of managing the movement of the cursor, in particular when the method according to the invention is implemented with the aid of a computer program. Most of the time the cursor is managed by the normal method of management except when it fulfills the attraction conditions, the cursor then being subjected to the method of processing the displacement of the cursor according to the invention and which is responsible for actually carrying out the attraction of the cursor toward a specified activatable zone.

A preferred exemplary method according to the invention will now be described in detail. This method carries out continually, except in the event of initialization of the cycle, the cycle consisting of the following succession of elementary operations:

if the cursor is not disabled:

calculation of a temporary position Pt of the cursor (for example position 2 in FIGS. 1 to 8), the temporary position Pt being the specified position toward which the cursor moves in the course of the cycle considered, on the basis on the one hand of the current position Pp of the cursor of the previous cycle (for example the position 1 in FIGS. 1 to 8) and on the other hand of a movement vector of the cursor (for example vector joining position 1 to position 2 in FIGS. 1 to 8) obtained on the basis of a command from a human operator (for example actuation of the multidirectional lever);

authorization of attraction toward each activatable zone for which, on the one hand the temporary position Pt is included in said activatable zone (10) or in the associated attraction zone corresponding to said activatable zone and on the other hand the portion (for example the half-line departing from the position 1 and directed from the position 1 toward the position 2 in FIGS. 1 to 8), posterior to the current position Pp of the previous cycle, of the line passing through the temporary positions Pp and Pt intercepts said activatable zone, except for the last activatable zone toward which the cursor has actually been attracted if the temporary position Pp of the previous cycle still lies in said last activatable zone at the start of the movement considered in the present cycle;

if the attraction is authorized toward at least one activatable zone:

for each activatable zone toward which the attraction is authorized, calculation of the distance lying between the temporary position Pt and the center of gravity (for example the center C in FIGS. 1 to 8) of said activatable zone, and selection of the activatable zone which minimizes said distance;

determination of a final position PF of the cursor (for example position 3 in FIGS. 1 to 8) which lies in the intersection between the selected activatable zone and the line passing through the temporary positions Pt and Pp;

assignment of the final position PF to the current position of the cursor;

disabling of the cursor;

passage to the next cycle;

if no attraction toward an activatable zone is authorized:

assignment of the normal disabling span to the disabling span;

assignment of the temporary position Pt to the current position of the cursor;

passage to the next cycle;

if the cursor is disabled:

assignment of the final position PFp of the previous cycle to the current position of the cursor;

an incrementation of the counter making it possible to count the disabling time until the disabling time exceeds the disabling span or until the command from the human operator is modified:

enabling of the cursor;

assignment of the reduced disabling span to the disabling span;

re-zeroing of the counter;

passage to the next cycle;

the initialization of the cycle comprising an elementary operation of enabling the cursor, an elementary operation of assigning the normal disabling span to the disabling span, an operation of re-zeroing the counter, as well as an assignment of the temporary position of the cursor on the one hand to the current position of the cursor and on the other hand to the final position of the cursor. The initialization is advantageously carried out during the energizing of the screen or during a change of window on the screen, that is to say when the movement of the cursor is controlled by an application method and not by the human operator.

The subject of the present invention relates to the processing method according to the invention as described in the whole of the preceding part of the text, as well as the processing module allowing the implementation of said method. The subject of the present invention also relates to the system comprising such a processing module and a screen associated with said processing module. The screen is preferably an aircraft console screen, since the commands of the human operator may be particularly inaccurate having regard to the flight conditions of the aircraft, whether this aircraft be civil or military, in particular during atmospheric turbulence. The method according to the invention applies in a particularly advantageous manner to the navigation windows comprising markers, since said markers are activatable zones of relatively small size. In the case of a navigation window, the temporal aspect in the processing method according to the invention is not critical since the processing is not a processing to be carried out in real time.

Figure 9:
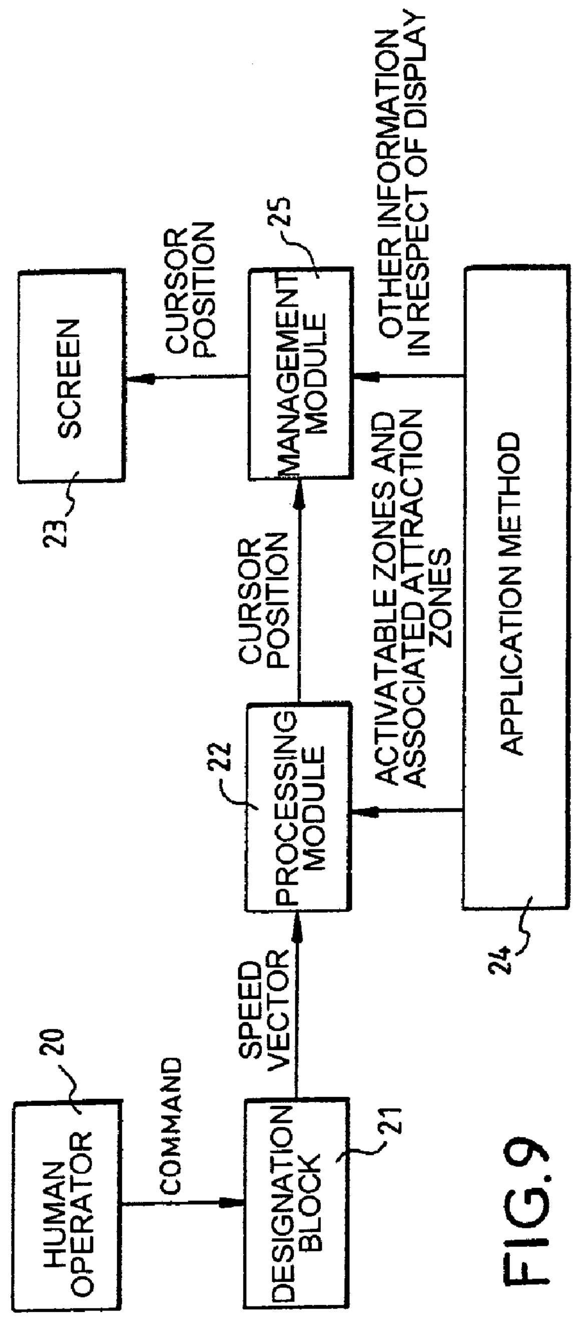
FIG. 9 represents a chopping into functional blocks of a preferred complete designation system comprising a processing module implementing the processing method according to the invention.

FIG. 9 represents a chopping into functional blocks of a preferred complete designation system comprising a processing module implementing the method of processing according to the invention. The complete designation system comprises a designation block 21 transmitting the command from the human operator 20 to the processing module 22, a processing module 22 implementing the processing method according to the invention, one or more application modules 24, a module 25 for managing the cursor and the screen, the management module 25 implementing the method of normal management of the cursor on which the processing method according to the invention is superimposed, and a display screen 23 over which the cursor displaces. The human operator 20, outside the designation system, is denoted 20. The human operator 20 supplies a command to the designation block 21 which supplies a speed vector cue to the processing module 22. With the aid of the location and the extent of the activatable zones and of the associated attraction zones, which are supplied by the application module or modules 24 to the processing module 22, the processing module 22 supplies in the event of actual attraction a cursor position to the management module 25 which supplies the screen 23 with a cursor position which is in fact specified by the management module 25 in the event of absence of actual attraction and which is in fact specified by the processing module 22 in the event of presence of actual attraction. The application module or modules 24 also supply other information, in respect of display, to the management module 25.

The role of the designation block is to transmit the commands from the human operator 20 to the processing module 22. The designation block is preferably a multidirectional control lever with a validation button. The lever then advantageously supplies the processing module 22 with a speed vector cue in respect of the movement of the cursor. This type of lever generally exhibits a law of variation of the speed vector cue supplied as a function of the command of the human operator 20 which must be adjusted very finely in order for the human operator 20 to use the multidirectional lever correctly; this law of variation can, when the method according to the invention is used, be adjusted more coarsely without appreciably disturbing the use of the multidirectional lever by the human operator 20.

In a first optional mode of embodiment, said multidirectional lever comprises a coding wheel type device, which device allows a supplementary mode of operation which disregards the attraction zones but consists in allowing the rotation, around the current position of the cursor, of four half-lines forming an orthogonal reference frame on the screen, an activatable zone intercepted by one of the half-lines being selectable by simply pressing on said lever in the direction corresponding to said half-line.

In a second optional mode of embodiment, said multidirectional lever comprises a coding wheel type device, which device allows a supplementary mode of operation which consists in allowing the rotation, around the current position of the cursor, of four half-lines forming an orthogonal reference frame on the screen, an activatable zone being selectable by simply pressing on said lever in the direction corresponding to one of the half-lines on condition that said half-line intercepts the attraction zone associated with said activatable zone.

What is claimed is:

1. A method of processing the movement of a cursor over a screen, said screen comprising one or more cursor activatable zones, at least one activatable zone being surrounded by an attraction zone which is associated therewith, the method comprising

- an evaluation step evaluating the direction d of the movement of the cursor, during the movement of the cursor, toward a specified position which is actual or fictitious,
- a conditional attraction step automatically placing the cursor on a specified activatable zone only if a first and a second conditions are fulfilled, the first condition being fulfilled if the specified position is situated in the attraction zone associated with the specified activatable zone, the second condition being fulfilled only if a portion of the line d representing movement of the cursor is situated in the vicinity of the specified activatable zone.

2. The method as claimed in claim 1, wherein the first condition is fulfilled only if the specified position is situated in the attraction zone associated with the specified activatable zone or in the specified activatable zone.

3. The method as claimed in claim 1, wherein the second condition is fulfilled only if the angle which a first line and a second line make between themselves, the first line being parallel to the direction of the movement of the cursor, the second line being the line which passes both through the center of the specified activatable zone and through the last current position of the cursor before the movement considered by the method, is less than a predetermined fixed threshold.

4. The method as claimed in claim 3, wherein the cursor is actually attracted toward the activatable zone which minimizes the angle between the first line and the second line when several activatable zones fulfill the attraction conditions.

5. The method as claimed in claim 1, wherein the second condition is fulfilled only if a portion of the line representing the movement of the cursor has a nonempty intersection with the specified activatable zone.

6. The method as claimed in claim 5, wherein the second condition is fulfilled only if a portion, posterior to an intermediate position which lies between the current position of the cursor at the end of the previous movement after processing by the method and the specified position or which coincides with one of said positions of the line representing the movement of the cursor has a nonempty intersection with the specified activatable zone.

7. The method as claimed in claim 6, wherein the intermediate position coincides with the current position of the cursor at the end of the previous movement after processing by the method.

8. The method as claimed in claim 5, wherein the specified activatable zone toward which the cursor can be attracted, can be any activatable zone with which an attraction zone is associated, except for the last activatable zone toward which the cursor has actually been attracted if the cursor is still in said last which cue originates from a command from a human operator.

9. The method as claimed in claim 1, wherein the location on which the cursor is placed, of the specified activatable zone is the intersection between the line representing the movement of the cursor and a predesignated part of the specified activatable zone when the cursor is automatically placed on a specified activatable zone during the conditional attraction step.

10. The method as claimed in claim 9, wherein each activatable zone is of rectangular shape and in that the predesignated part consists of the two diagonals of the rectangular shape.

11. The method as claimed in claim 1, wherein all the attraction zones situated on one and the same window of the screen have the same size.

12. The method as claimed in claim 1, wherein an attraction zone is around some ten times more extensive than the activatable zone associated therewith.

13. The method as claimed in claim 1, wherein, in the absence of actual attraction of the cursor, the specified position is periodically evaluated by the method with a predetermined sampling period.

14. The method as claimed claim 1, wherein the specified position is a position evaluated by the method on the basis of a speed vector cue for the movement of the cursor, which cue originates from a command from a human operator.

15. The method as claimed in claim 13, wherein the specified position is obtained by the addition, to the current position of the cursor at the end of the previous period, of a movement vector corresponding to the product of the movement speed vector times the sampling period.

16. The method as claimed in claim 15, that wherein the line representing the movement of the cursor evaluated by the method is the line passing both through the specified position and through the current position of the cursor at the end of the previous period.

17. The method as claimed in claim 16, wherein the dimension of the attraction zone is greater than the portion of line lying between the current position of the cursor at the end of the previous period and the specified position.

18. The method as claimed in claim 1, wherein after an actual attraction of the cursor, the cursor is disabled for a normal disabling span compatible with a reaction of the human operator allowing him to stop the movement of the cursor.

19. The method as claimed in claim 18, wherein the normal disabling span lies between 250 ms and 350 ms.

20. The method as claimed in claim 18, wherein, after actual attraction of the cursor, in the event of holding of the movement of the cursor by the human operator, the normal disabling span is reduced to a reduced disabling span for the next actual attraction if the latter immediately succeeds the actual attraction which precedes it.

21. The method as claimed in claim 20, wherein the reduced disabling span lies between 100 ms and 150 ms.

22. The method as claimed in claim 1, wherein when several activatable zones fulfill the attraction conditions, the cursor is actually attracted toward the activatable zone which is the closest to the specified position.

23. The method as claimed in claim 1, wherein the method is superimposed on the normal method of managing the movement of the cursor whilst remaining independent of the normal method of managing the movement of the cursor.

24. The method as claimed in claim 1, wherein the method carries out continually, except in the event of initialization of the cycle, the cycle consisting of the following succession of elementary operations:

if the cursor is not disabled:

calculation of a temporary position Pt of the cursor, the temporary position Pt being the specified position toward which the cursor moves in the course of the cycle considered, on the basis on the one hand of the current position Pp of the cursor of the previous cycle and on the other hand of a movement vector of the cursor obtained on the basis of a command from a human operator;

authorization of attraction toward each activatable zone for which, on the one hand the temporary position Pt is included in said activatable zone or in the associated attraction zone corresponding to said activatable zone and on the other hand the portion, posterior to the current position Pp of the previous cycle, of the line passing through the temporary positions Pp and Pt intercepts said activatable zone, except for the last activatable zone toward which the cursor has actually been attracted if the temporary position Pp of the previous cycle still lies in said last activatable zone at the movement considered in the present cycle;

if the attraction is authorized toward at least one activatable zone:

for each activatable zone toward which the attraction is authorized, calculation of the distance lying between the temporary position Pt and the center of gravity of said activatable zone, and selection of the activatable zone which minimizes said distance;

determination of a final position PF of the cursor which lies in the intersection between the selected activatable zone and the line passing through the temporary positions Pt and Pp;

assignment of the final position PF to the current position of the cursor;

disabling of the cursor;

passage to the next cycle;

if no attraction toward an activatable zone is authorized:

assignment of the normal disabling span to the disabling span;

assignment of the temporary position Pt to the current position of the cursor;

passage to the next cycle;

if the cursor is disabled:

assignment of the final position PFp of the previous cycle to the current position of the cursor;

an incrementation of the counter making it possible to count the disabling time until the disabling time exceeds the disabling span or until the command from the human operator (20) is modified:

enabling of the cursor;

assignment of the reduced disabling span to the disabling span;

re-zeroing of the counter;

passage to the next cycle;

the initialization of the cycle comprising an elementary operation of enabling the cursor, an elementary operation of assigning the normal disabling span to the disabling span, an operation of re-zeroing the counter.

25. The method as claimed in claim 24, wherein the initialization is carried out when during the energizing of the screen or during a change of window on the screen.

26. A system for controlling the movement of a cursor over a screen comprising a processing module with means suitable for carrying out the space of the method according to claim 1, the screen being associated with said processing module.

27. The system as claimed in claim 26, wherein the screen is an aircraft console screen.

28. The system as claimed in claim 27, wherein the processing module manages at least one navigation window comprising markers.

29. The system as claimed in claim 26, wherein it also comprises a designation block transmitting the commands from the human operator to the processing module.

30. The system as claimed in claim 29, wherein the designation block is multi-directional control lever with a validation button, said lever supplying the processing module with a speed vector cue in respect of the movement of the cursor.

31. The system as claimed in claim 30, wherein said lever comprises a coding wheel type device, which device allows a supplementary mode of operation which disregards the attraction zones but consists in allowing the rotation, around the current position of the cursor, of four half-lines forming an orthogonal reference frame on the screen, an activatable zone intercepted by one of the half-lines being selectable by simply pressing on said lever in the direction corresponding to said half-line.

32. The system as claimed in claim 30, wherein said lever comprises a coding wheel type device, which device allows a supplementary mode of operation which consists in allowing the rotation, around the current position of the cursor, of four half-lines forming an orthogonal reference frame on the screen, an activatable zone being selectable by simply pressing on said lever in the direction corresponding to one of the half-lines on condition that said half-line intercepts the attraction zone associated with said activatable zone.

* * * * *